US007937859B2

(12) United States Patent  (10) Patent No.: US 7,937,859 B2
Downes                          (45) Date of Patent: May 10, 2011

(54) WHEELED LOAD TRANSFER DEVICE

(76) Inventor: George R. Downes, Bella Vista (AU)

( * ) Notice: Subject to any disclaimer, the term of this patent is extended or adjusted under 35 U.S.C. 154(b) by 0 days.

(21) Appl. No.: 12/001,282

(22) Filed: Dec. 11, 2007

(65) Prior Publication Data

US 2008/0115394 A1    May 22, 2008

Related U.S. Application Data

(63) Continuation-in-part of application No. 11/520,293, filed on Sep. 13, 2006, now abandoned.

(30) Foreign Application Priority Data

Sep. 13, 2005 (AU) ................................ 2005905050

(51) Int. Cl.
*E02F 3/32* (2006.01)
*E02F 5/02* (2006.01)
(52) U.S. Cl. ................ 37/434; 37/265; 37/285; 37/445; 37/241; 294/54.5; 294/55
(58) Field of Classification Search ............... 37/265, 37/284, 285, 445, 434, 241; 294/55, 56, 294/53.5, 51, 54
See application file for complete search history.

(56) References Cited

U.S. PATENT DOCUMENTS

| 316,181 | A | * | 4/1885 | Reithmayer | 37/284 |
| 593,969 | A | * | 11/1897 | Patton | 37/445 |
| 768,871 | A | * | 8/1904 | Albertson | 15/257.3 |
| 830,871 | A | * | 9/1906 | Wilken | 37/283 |
| 887,874 | A | * | 5/1908 | Toy | 37/434 |
| 1,053,438 | A | * | 2/1913 | Resch | 15/257.3 |
| 1,200,196 | A | * | 10/1916 | Huberty | 37/434 |
| 1,550,938 | A | * | 8/1925 | Walsh | 414/725 |
| 1,797,471 | A | * | 3/1931 | Jones | 446/428 |
| 2,544,505 | A | * | 3/1951 | Kronhaus | 414/554 |
| 2,752,631 | A | * | 7/1956 | Wendt | 425/181 |
| 2,965,910 | A | | 12/1960 | Van Ranst | |
| 3,026,138 | A | | 3/1962 | Benjamin et al. | |
| 3,028,695 | A | * | 4/1962 | Westby | 37/434 |
| 3,037,308 | A | | 6/1962 | Miller | |
| 3,043,033 | A | * | 7/1962 | Ingram et al. | 37/434 |
| 3,063,174 | A | * | 11/1962 | Ludin | 37/434 |
| 3,107,446 | A | * | 10/1963 | Messinger | 37/434 |
| 3,121,963 | A | * | 2/1964 | Nolan | 37/265 |
| 3,154,869 | A | * | 11/1964 | Pyrak | 37/434 |
| 3,337,973 | A | * | 8/1967 | Prescott | 37/265 |

(Continued)

OTHER PUBLICATIONS

Beach, Thomas A., Office Action against the parent case; U.S. Appl. No. 11/520,293, filed Sep. 13, 2006, confirmation No. 7951, mailed Feb. 23, 2009.

*Primary Examiner* — Thomas A Beach
(74) *Attorney, Agent, or Firm* — Stetina Brunda Garred & Brucker; Lowell Anderson

(57) ABSTRACT

A wheeled load transfer device has a load carrying member, a handle assembly and a pair of wheels optionally connected to a distal end of the handles and preferably offset below the plane of the handles. The load carrying member includes opposing side portions, a bottom portion. The load carrying member is rotatable between a first loading position which is preferably parallel to the ground and a second load transporting position which is inclined to the ground to better retain the load. The load carrying member can be rotated to different positions to scoop, transport and dump the load.

17 Claims, 19 Drawing Sheets

U.S. PATENT DOCUMENTS

| | | | | |
|---|---|---|---|---|
| 3,594,932 A * | 7/1971 | Eriksson | | 37/241 |
| 3,833,262 A * | 9/1974 | Tasse | | 298/2 |
| 3,923,331 A * | 12/1975 | Hollnagel | | 37/265 |
| 4,042,269 A * | 8/1977 | Skermetta | | 294/1.5 |
| 4,062,591 A * | 12/1977 | Harris et al. | | 298/2 |
| 4,130,953 A * | 12/1978 | Bruno | | 37/265 |
| 4,161,073 A * | 7/1979 | Oakes | | 37/265 |
| 4,166,330 A * | 9/1979 | Flick | | 37/270 |
| 4,302,894 A * | 12/1981 | Emma | | 37/434 |
| 4,457,548 A | 7/1984 | Robins et al. | | |
| 4,619,474 A | 10/1986 | Dauphinais | | |
| 4,632,461 A * | 12/1986 | Randolph | | 298/2 |
| 4,709,440 A * | 12/1987 | Conelly | | 15/257.3 |
| 5,018,282 A * | 5/1991 | Hong | | 37/434 |
| 5,048,206 A * | 9/1991 | Jones | | 37/265 |
| 5,074,064 A * | 12/1991 | Nickels | | 37/265 |
| 5,123,187 A * | 6/1992 | Zamaria | | 37/265 |
| 6,164,710 A * | 12/2000 | Shibuya | | 294/1.5 |
| 6,457,757 B2 * | 10/2002 | Hendrick | | 294/54.5 |
| 6,523,839 B2 * | 2/2003 | Simmons et al. | | 280/47.34 |
| 6,922,920 B1 * | 8/2005 | Stratz | | 37/197 |
| 2005/0160632 A1 * | 7/2005 | Williams | | 37/265 |

* cited by examiner

WHEELED LOAD TRANSFER DEVICE

CROSS-REFERENCE TO RELATED APPLICATIONS

The present application is a continuation-in-part of U.S. application Ser. No. 11/520,293 entitled Wheeled Load Transfer Device which was filed on Sep. 13, 2006, now abandoned, which claims priority to Australian Provisional Patent Application No. 2005905050 entitled Wheeled Load Transfer Device which was filed on Sep. 13, 2005.

STATEMENT RE: FEDERALLY SPONSORED RESEARCH/DEVELOPMENT

Not Applicable

BACKGROUND

The present invention relates to load carrying devices and, more particularly, to wheeled, manually operated devices.

Various wheeled devices have been devised for transferring quantities of loose material, such as for example sand, soil, road base, gravel and compost, from one location to another. Probably the best known and most used is the common single wheeled wheelbarrow.

A disadvantage of the wheelbarrow is that the material to be transported in it must be raised to a level where it can be deposited into the body of the barrow. This requires considerable repetitive strain on the back of a user in shovelling the material over the rim of the barrow body.

Further disadvantages of a common wheelbarrow, include that a fully laden barrow is awkward to wheel, taking considerable skill and strength. Also, the emptying of the barrow, unless effected by laborious shovelling out of its contents, requires tilting the barrow load over the wheel centre to allow the contents to slide out. Again, this is an operation requiring strenuous effort from a user. Thus, particularly for people with weak, or lower back injuries, the effective use of a wheelbarrow for the purposes of transporting loads of material is virtually precluded.

It is an object of the present invention to address or ameliorate some of the above disadvantages.

Notes

The term "comprising" (and grammatical variations thereof) is used in this specification in the inclusive sense of "having" or "including", and not in the exclusive sense of "consisting only of".

The above discussion of the prior art in the Background of the invention, is not an admission that any information discussed therein is citable prior art or part of the common general knowledge of persons skilled in the art in any country.

BRIEF SUMMARY

Accordingly, in a first broad form of the invention, there is provided a wheeled load transfer device comprising a load carrying member, a handle assembly and a pair of wheels; said load carrying member comprising opposing side portions, a bottom portion and a rear portion; said load carrying member rotatable between a first loading position and second load transporting position.

Preferably, said load carrying member is provided with a discharge door in one portion of said load carrying member; said device adapted for scooping movement along a ground surface.

Preferably, respective ones of said pair of wheels are mounted to respective axle housings; said axle housings affixed to respective said opposing side portions; said axle housings having a common axis; respective ones of said pair of wheels disposed at opposing sides of said load carrying member; said load carrying member at least partially located between said pair of wheels.

Preferably, said discharge door is a rear discharge door substantially coextensive with said rear portion; said rear discharge door pivotally hinged proximate an upper edge of said discharge door.

Preferably, respective ones of said pair of wheels are mounted to a common axle member; said wheels having a common axis; said pair of wheels located rearward of said rear portion and substantially inboard relative said side portions of said load carrying member.

Preferably, said load carrying member is pivotally connected to said common axle member; said load carrying member rotatable between a loading position and a load transporting position.

Preferably, said discharge door is substantially coextensive with said bottom portion of said load carrying member; said discharge door hingedly connected to a front lip of said load carrying member.

Preferably, a trailing edge of said discharge door is releasably latched in a closed position when said load carrying member is in said scooping position and in said transporting position.

Preferably, said handle assembly comprises first and second handle members and at least one cross member; said handle assembly pivotable about said common axis of said pair of wheels; said handle assembly pivotable between at least one fixed position latched to said load carrying member and unlatched positions.

Preferably, said handle assembly is provided with a first latching mechanism; said first latching mechanism adapted to releasably lock said handle assembly into said at least one fixed position relative said load carrying member; and wherein said first latching mechanism may be brought into engagement with said load carrying member by rotation upwardly of said handle assembly from said unlatched positions.

Preferably, said discharge door is provided with a second latching mechanism; said second latching mechanism adapted to releasing said discharge door from a closed load retaining position to an open load discharge position; and wherein said material is discharged from said load carrying member by operating said second latching mechanism to release said discharge door from said closed load retaining position to an open discharge position.

Preferably, said second latching mechanism is a foot operated latch located adjacent said trailing edge of said discharge door.

Preferably, each of said first latching mechanism and said second latching mechanism is operable by respective lever assemblies and respective first and second cables; said lever assemblies mounted to respective said handle members.

Preferably, when said load carrying member is in said loading position, a front lip of said load carrying member is in contact with said ground surface supporting said device, and wherein said bottom portion is at a slight upward inclination to said surface; said inclination sufficient to provide clearance between a rear lower edge of said load carrying member and said supporting ground surface.

Preferably, said device may be urged into a scooping motion so as to load material from a volume of said material disposed on said ground surface, into said load carrying member; loading of said material effected without need of hand held implements.

Preferably, after engagement of said handle assembly with said load carrying member, said device is brought into a position for transporting said material in said load carrying member by rotation downwardly of said handle assembly; outer ends of said handle assembly then at a height proximate the waist of an average user; said bottom portion of said load carrying member then inclined downwardly so as to secure said material within said load carrying member.

Preferably, said load carrying member is located substantially over said pair of wheels when said device is in said load transporting position; a load in said load carrying member than substantially centred over said pair of wheels.

Preferably, said load carrying member is provided with an upper cover segment; said cover segment extending between said side portions and partially covering an open side of said load carrying member; said cover segment provided with a second latching element adapted to releasably engage with said first latching mechanism thereby to lock said handle assembly into a second fixed position relative said load carrying member; said second fixed position adapted to provide a greater angle of downward inclination of said bottom portion of said load carrying member during discharge of said material.

Preferably, lower rear edge of said load carrying member is hingedly attached to a pair of arms; said arms extending forwardly from an axle between said pair of wheels.

Preferably, a strut is pivotally attached to said pair of arms; said strut rotatable between a first position wherein outer ends of said strut are attached to said rear portion of said load carrying member, and a second position wherein outer ends of said strut are attached to said handle assembly.

Preferably, said strut is in said first position when said load carrying member is in said loading position; and wherein said strut is in said second position when said load carrying member is in said load transporting position and in a load discharging position.

Preferably, a load of material is discharged from said load carrying member when said load carrying member is unlatched from said handle assembly and said handle assembly is rotated to said position wherein outer ends of said handle assembly are proximate the waist of an average user; said load carrying member then rotated into a position wherein said bottom portion of said load carrying member is then in a steeply inclined position.

In a further broad form of the invention, there is provided a method for loading and transporting material by means of a wheeled load transfer device; said method not requiring use of hand-held implements; said method including the steps of:
(a) unlatching a load carrying member of said device from a latched position relative a handle assembly so as to rotate said load carrying member into a scooping position relative said handle assembly,
(b) urging said load carrying member against a volume of material disposed on a supporting ground surface so as to load at least a portion of said material into said load carrying member,
(c) rotating said handle assembly upwardly to a latched position relative said load carrying member,
(d) rotating said handle assembly downwardly to bring outer portions of said handle assembly proximate the waist of an average user,
(e) wheeling said transfer device to an unload destination.

Preferably, said method includes the further step of:

unlatching a discharge door from a first locked position to rotate to a second open discharge position.

Preferably, said method includes the further steps of:
(a) rotating said load carrying member and said handle assembly such that said load carrying member is returned to said loading position,
(b) unlatching said handle assembly from said load carrying member,
(c) rotating said handle assembly downwardly to a load transporting position thereby to rotate said load carrying member into a discharge position wherein a bottom portion of said load carrying member is in a steeply inclined position.

BRIEF DESCRIPTION OF THE DRAWINGS

These and other features and advantages of the various embodiments disclosed herein will be better understood with respect to the following description and drawings, in which like numbers refer to like parts throughout, and in which:

DETAILED DESCRIPTION

Figure 1:
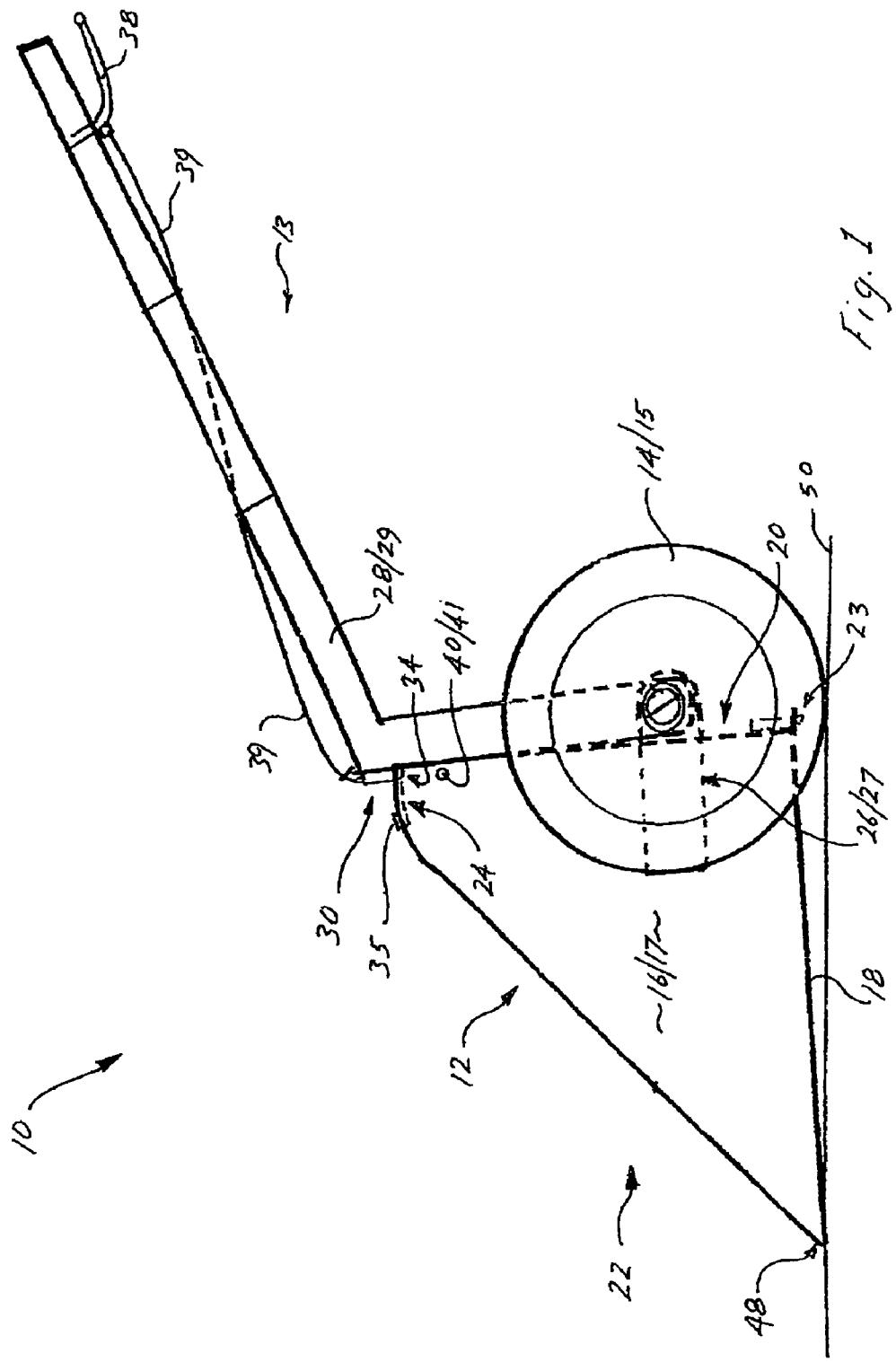
Figure 2:
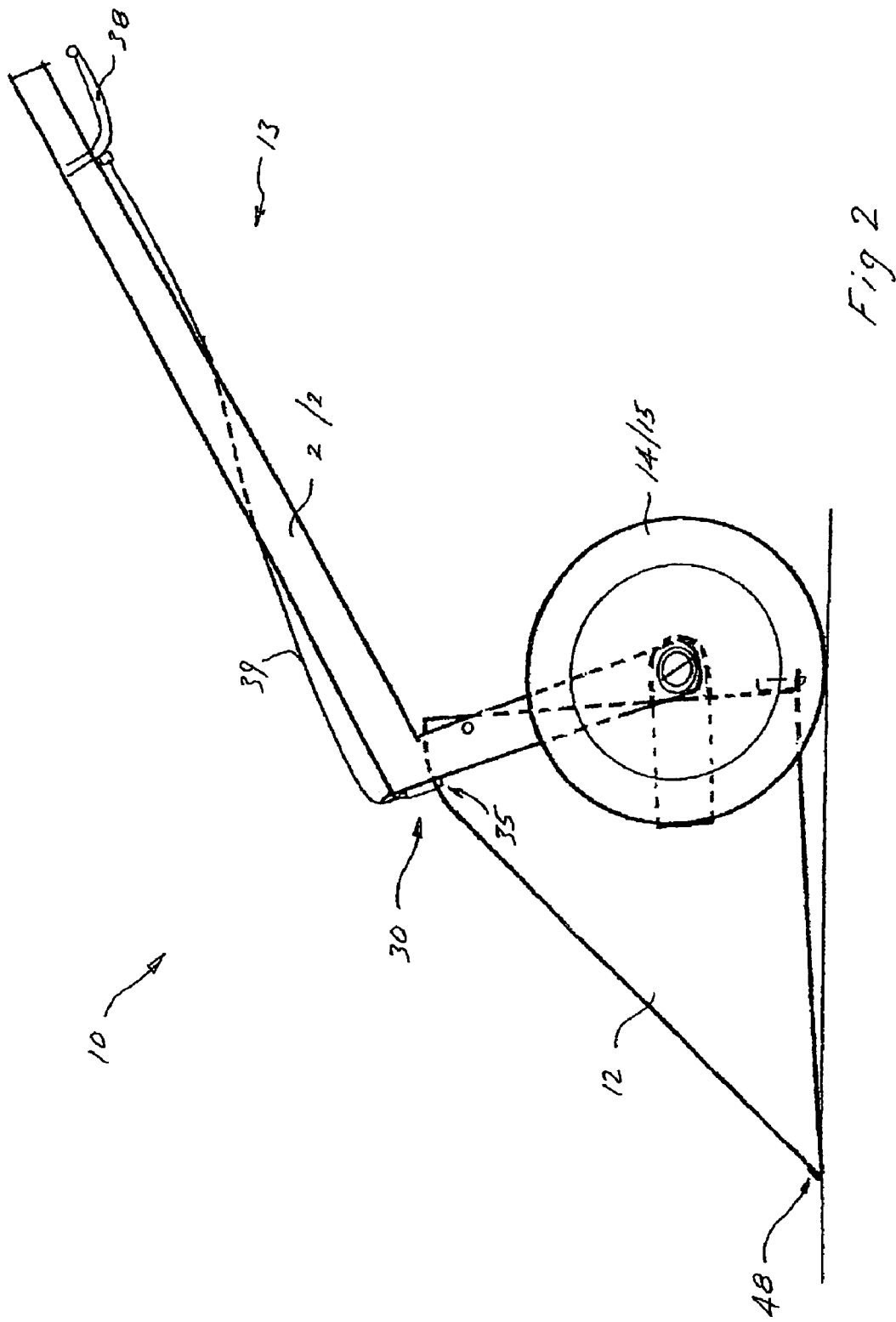
Figure 3:
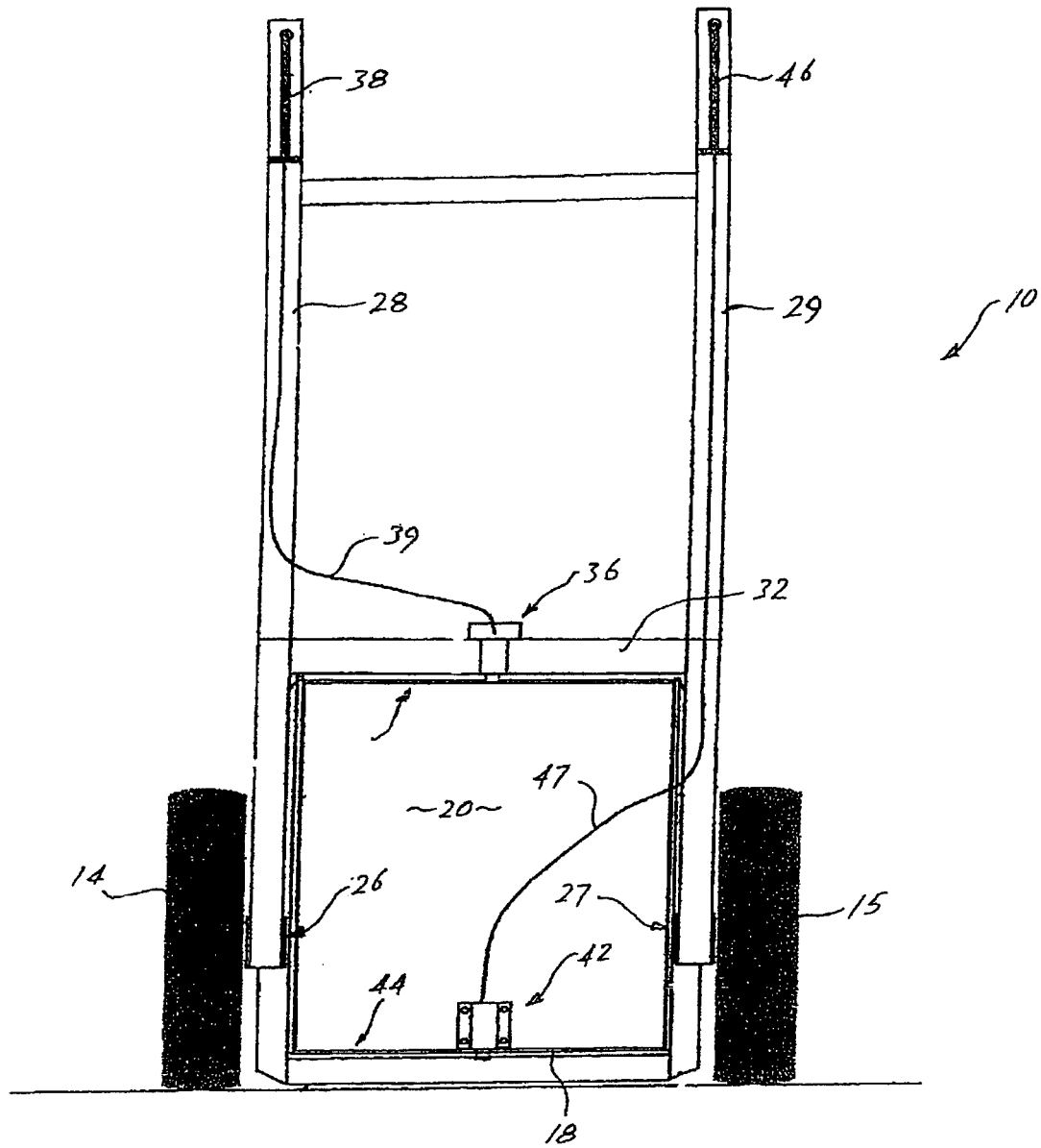
Figure 4:
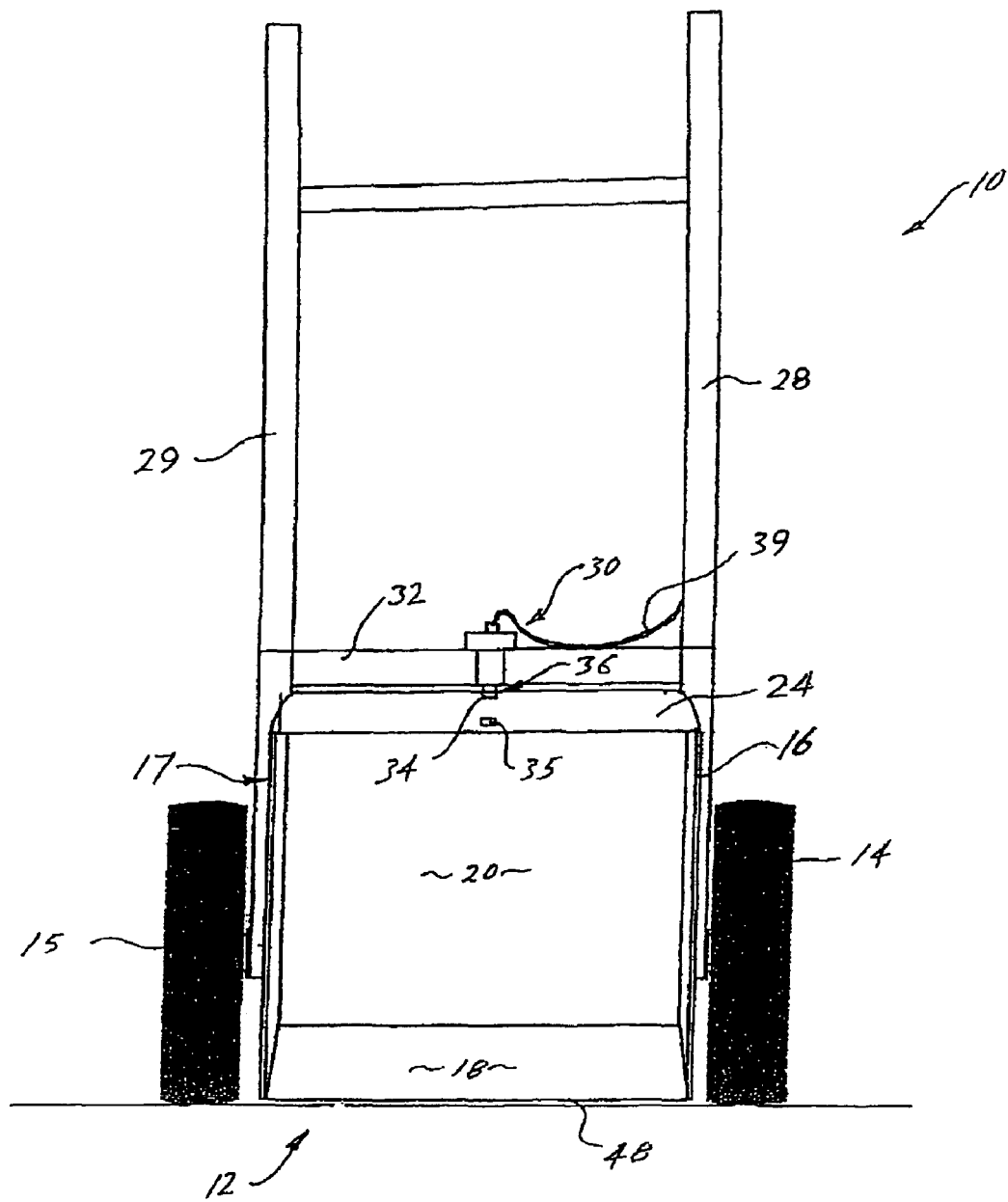
Figure 5:
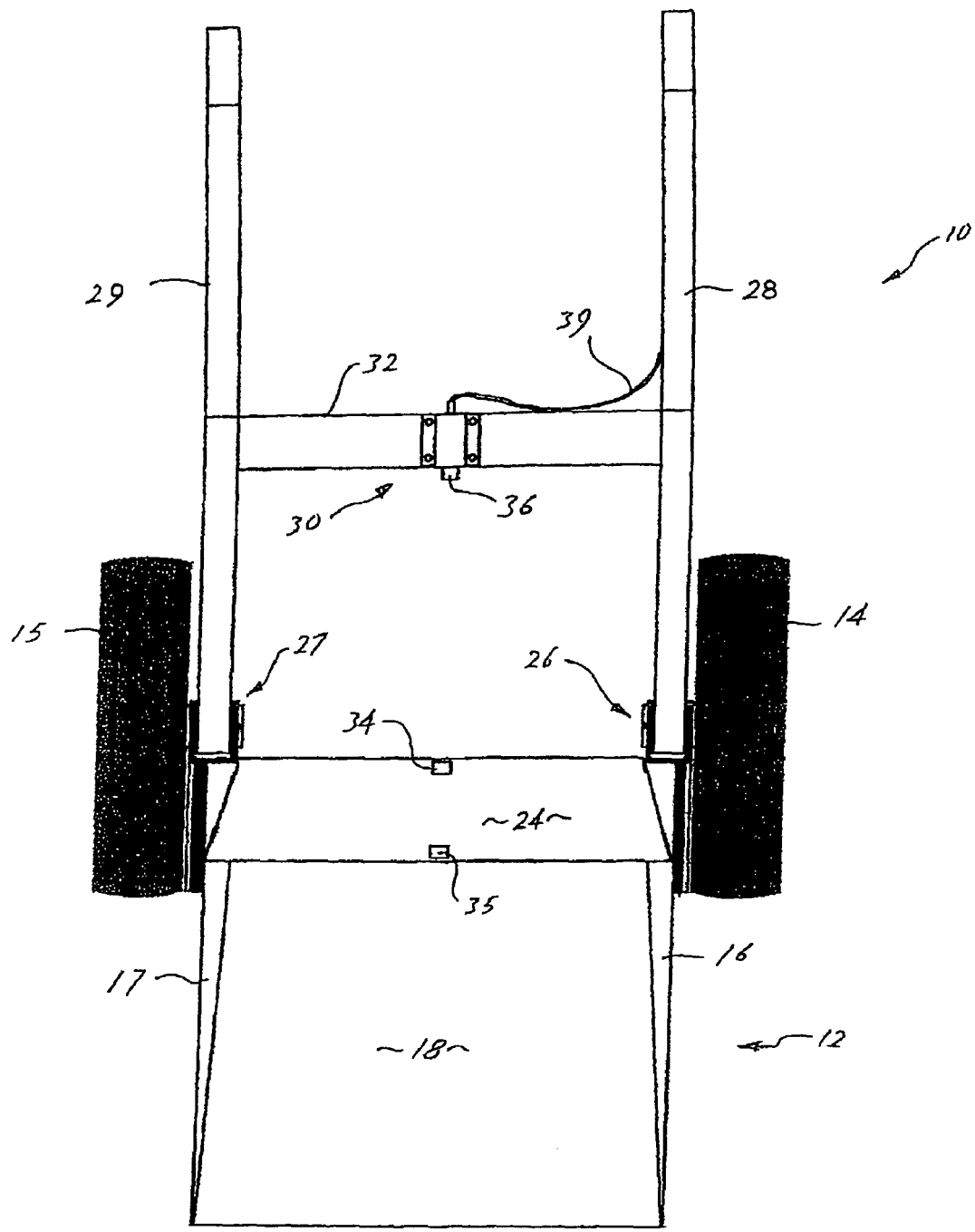
Figure 6:
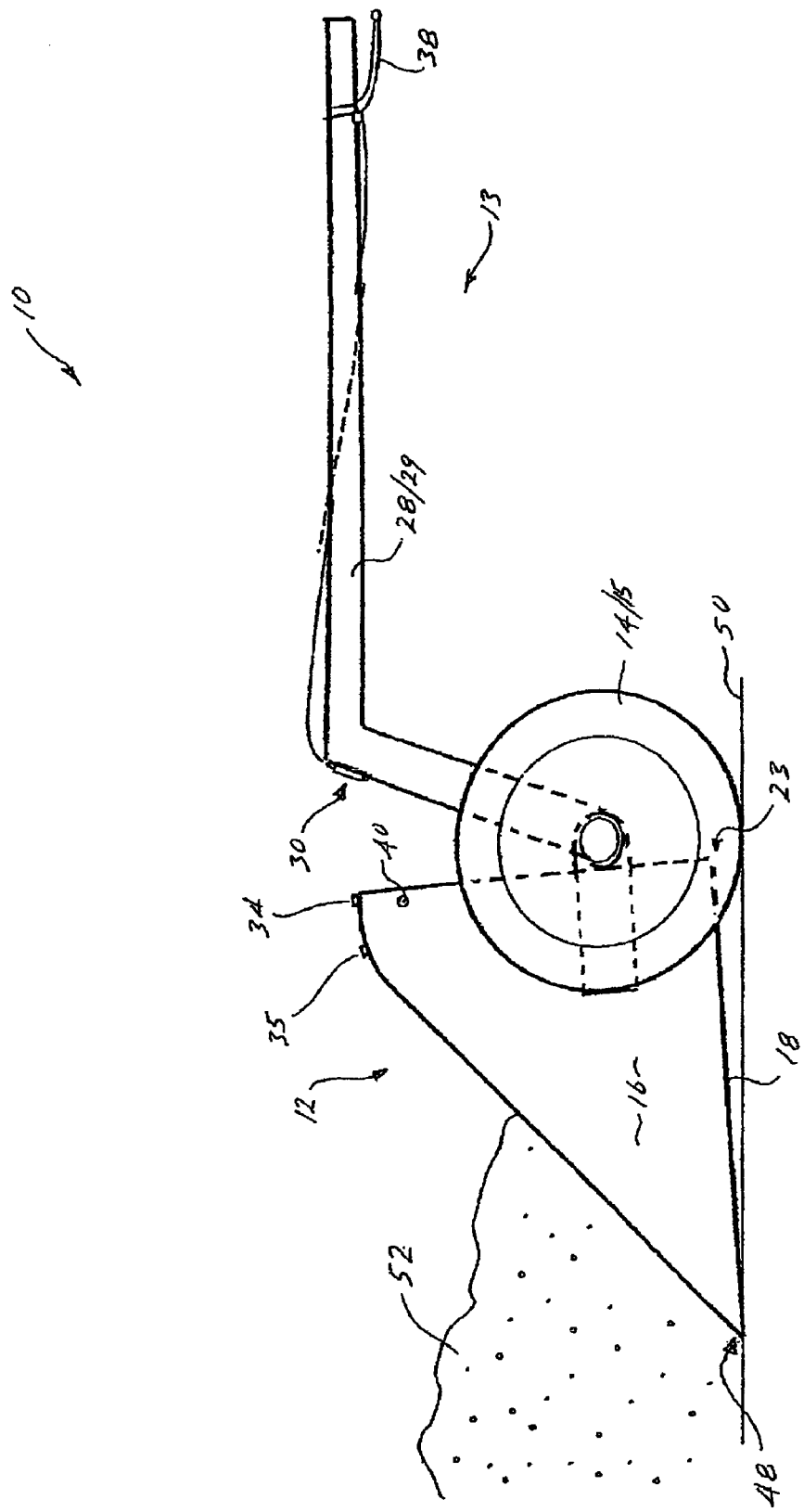
Figure 7:
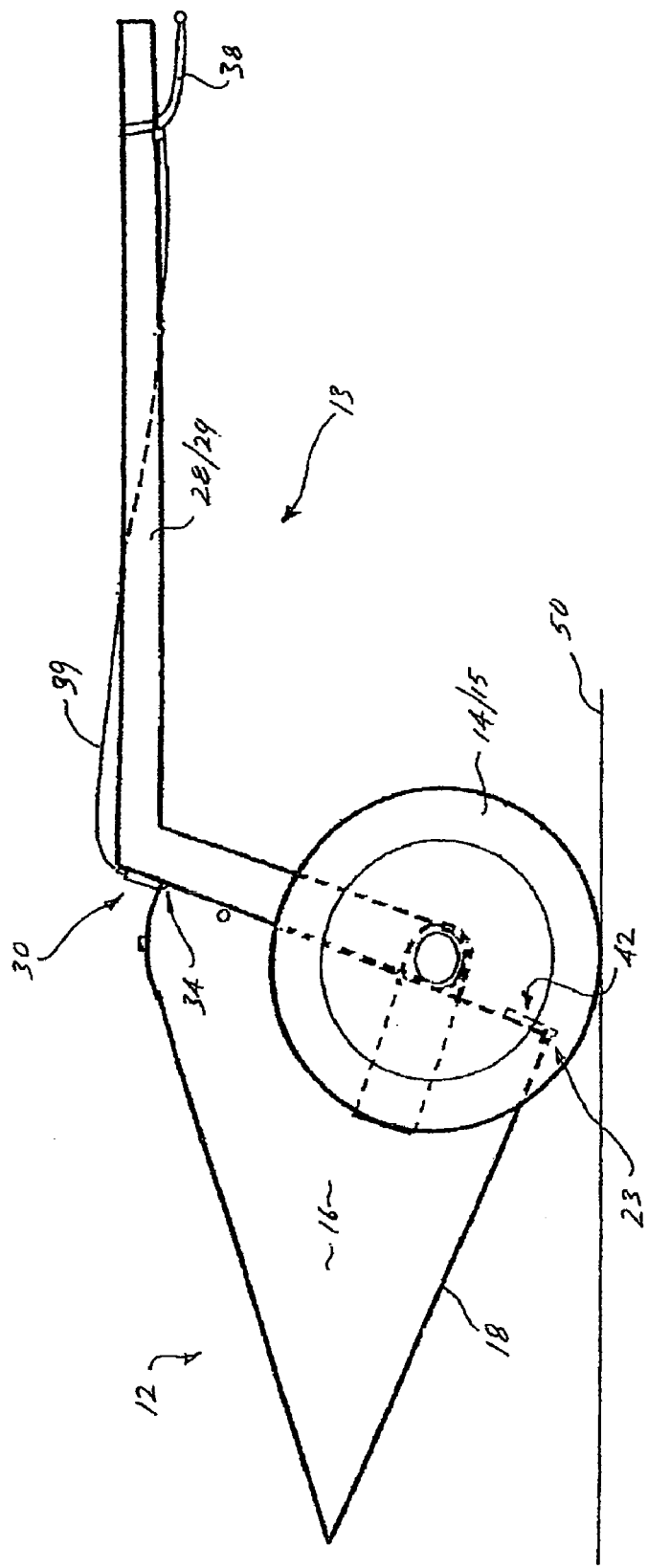
Figure 8:
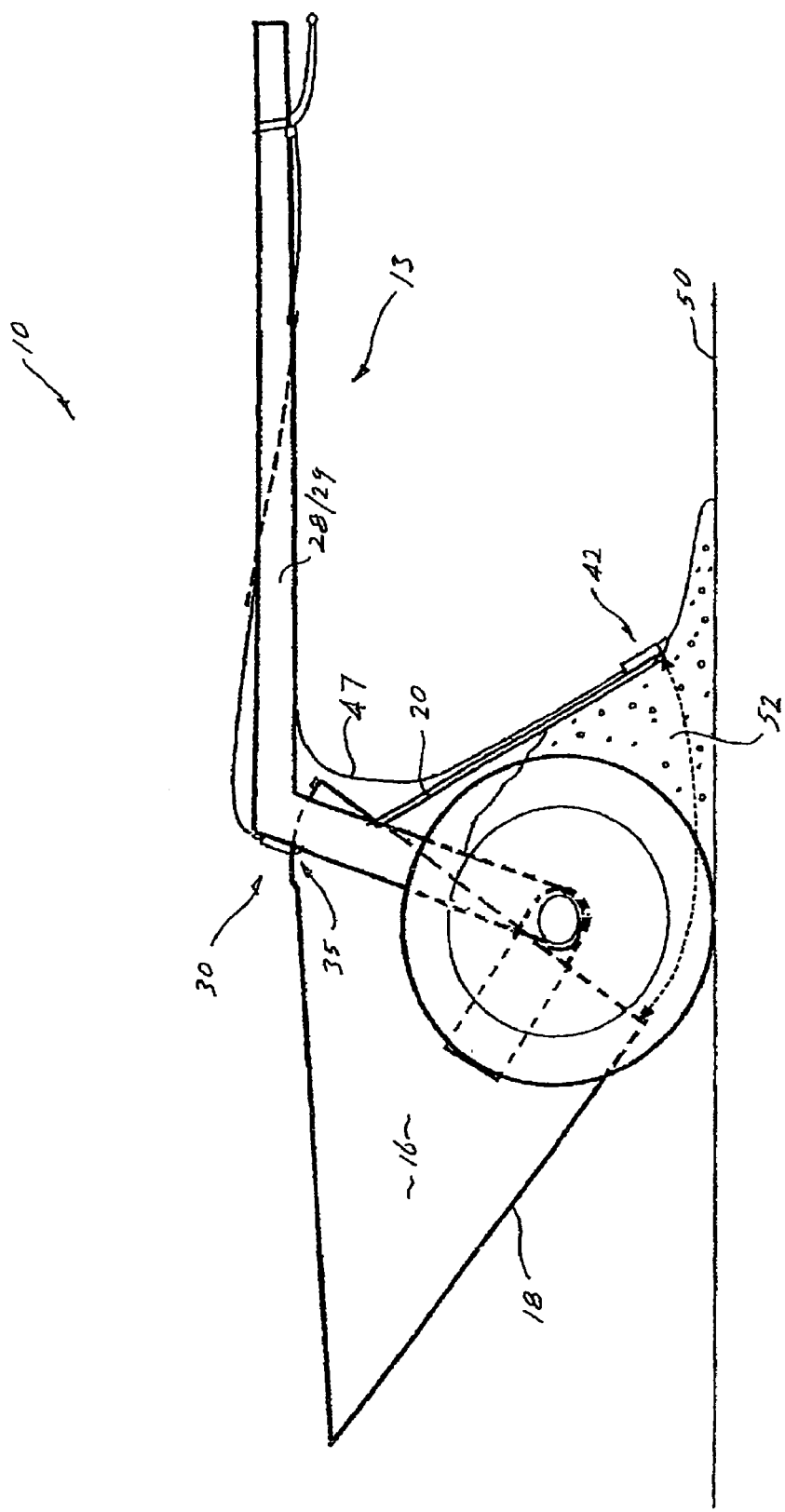
Figure 9:
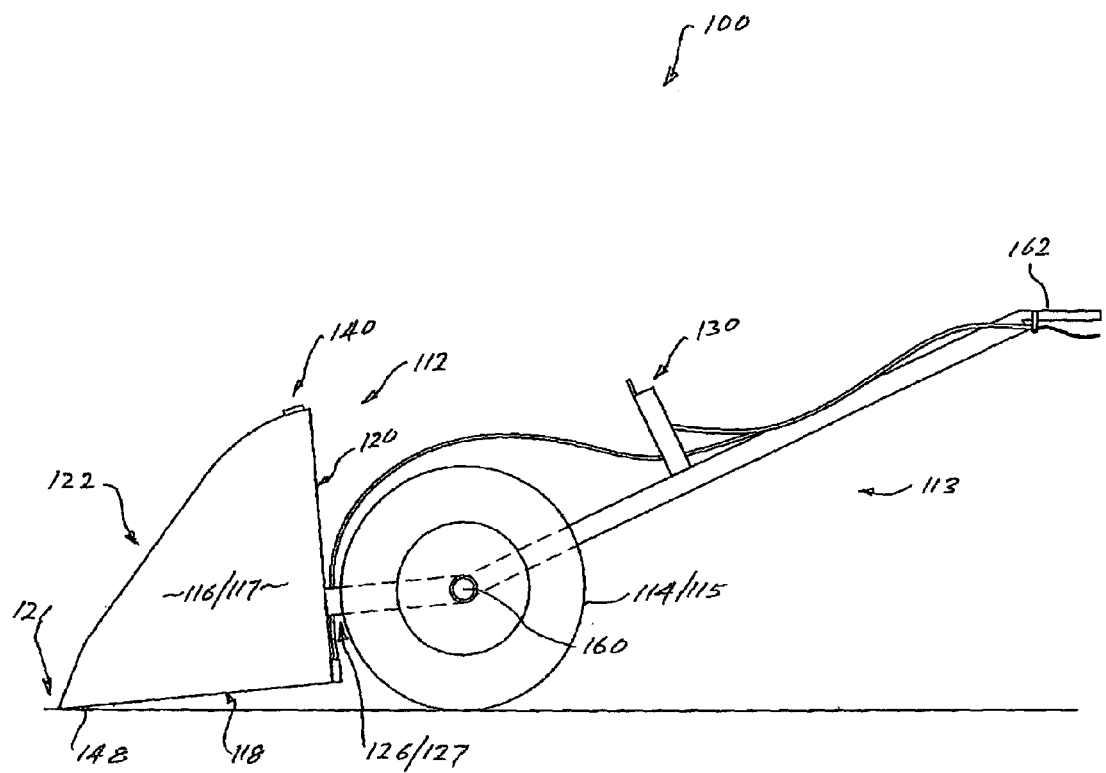
Figure 10:
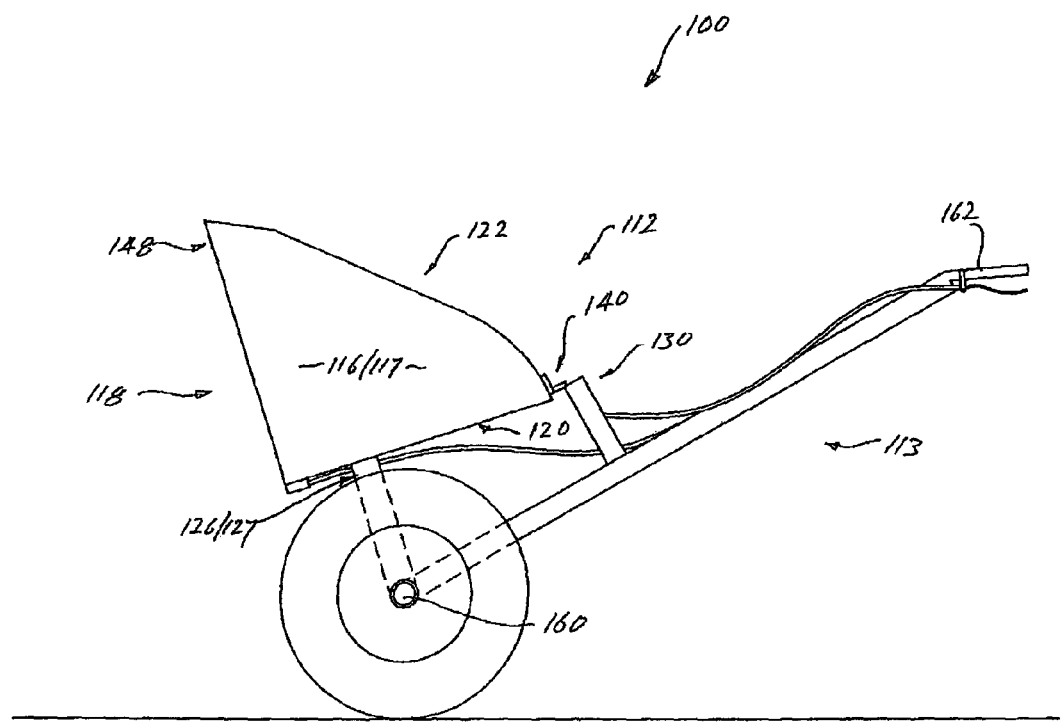
Figure 11:
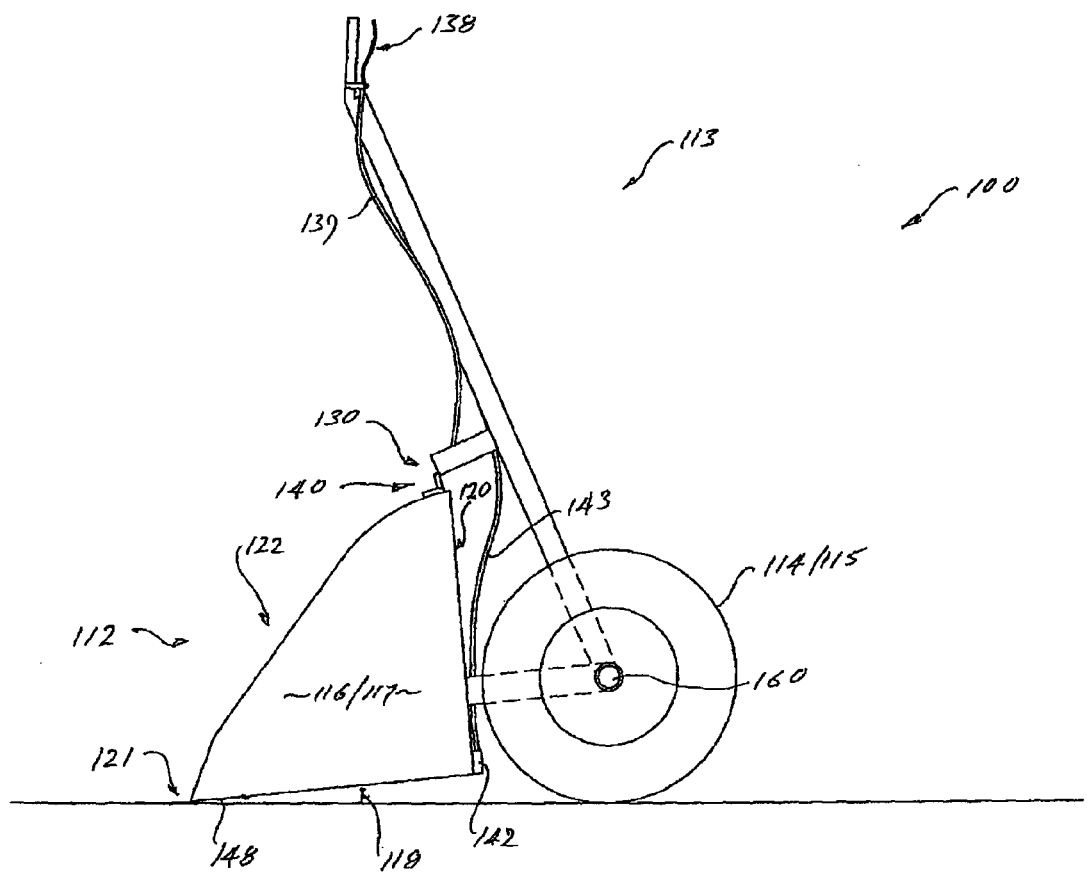
Figure 12:
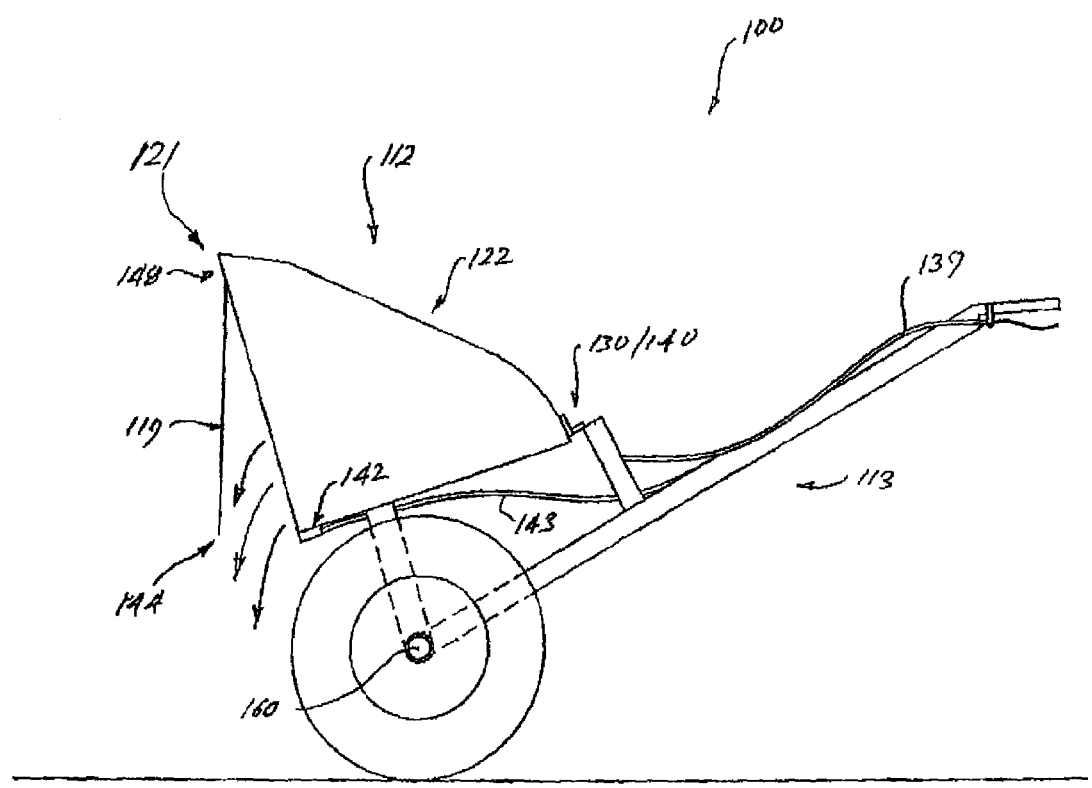
Figure 13:
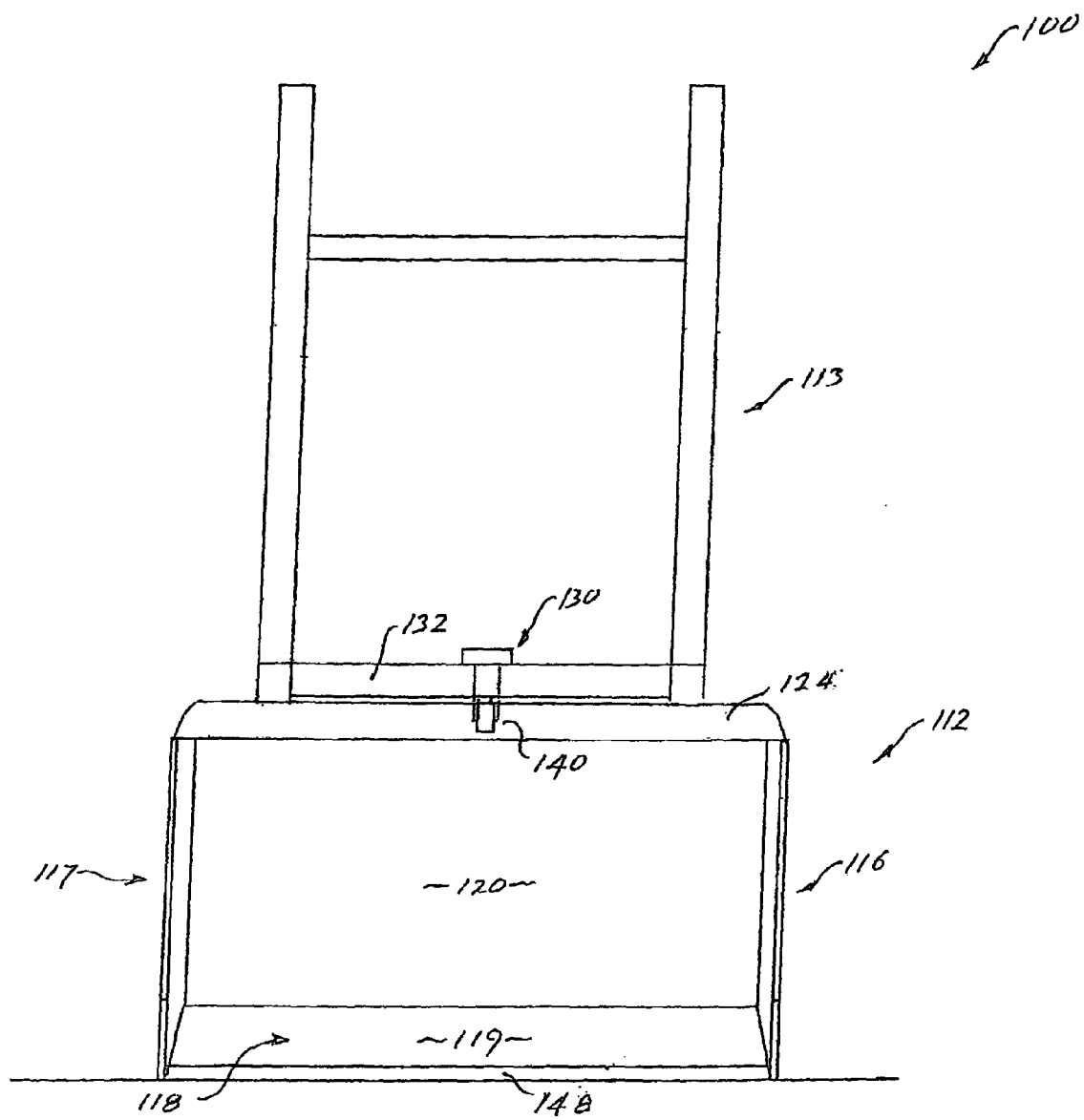
Figure 14:
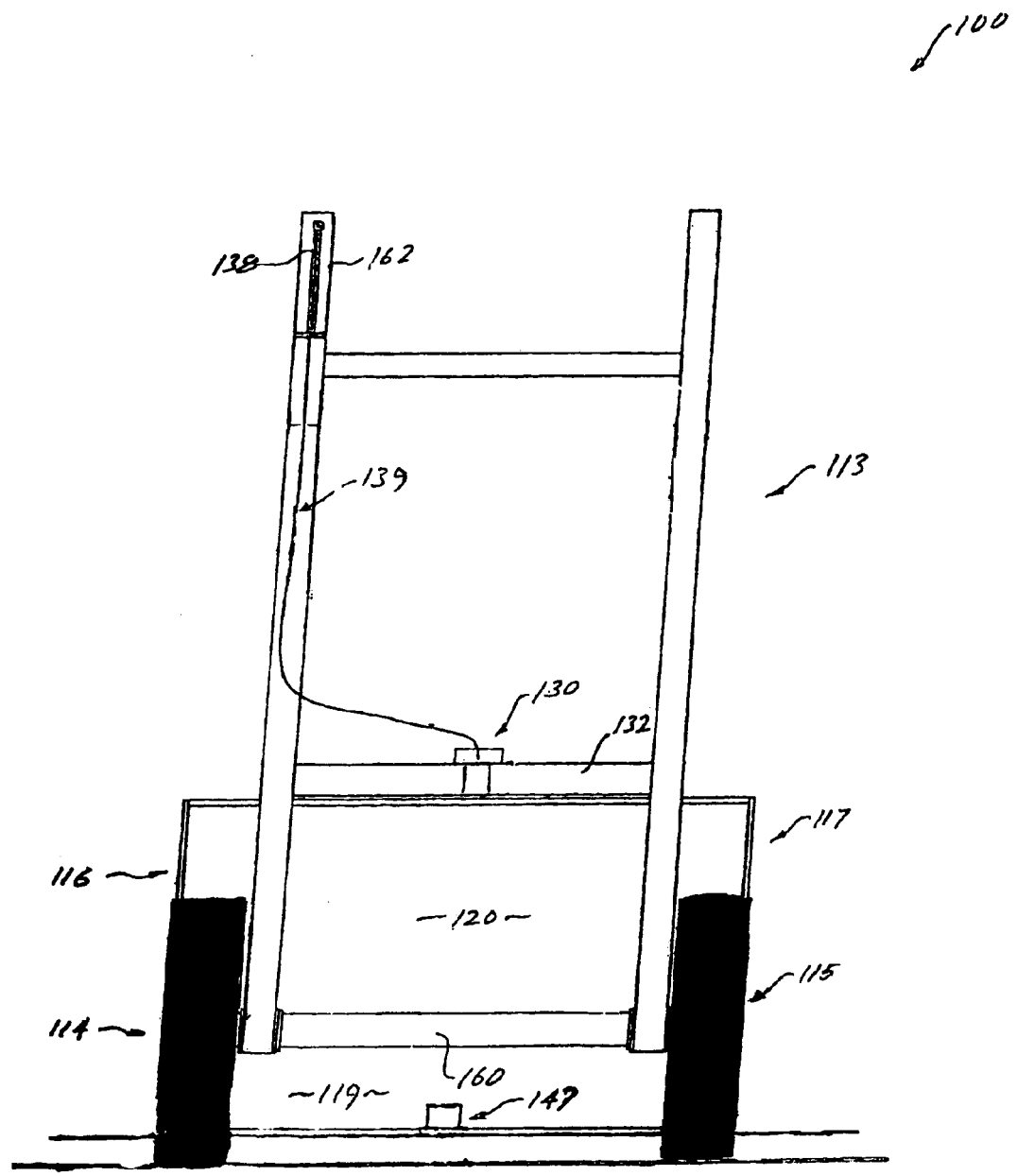
Figure 15:
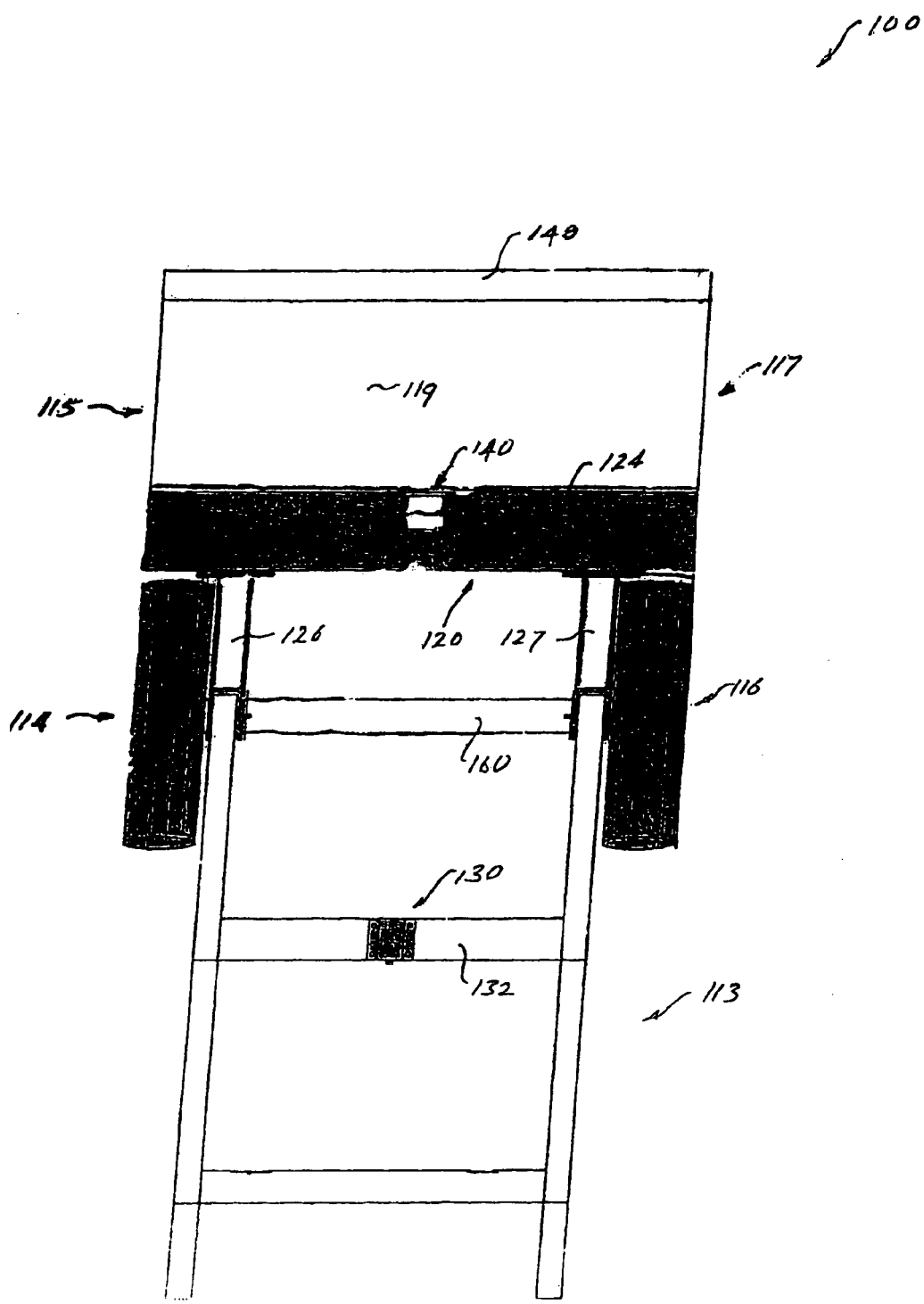
Figure 16:
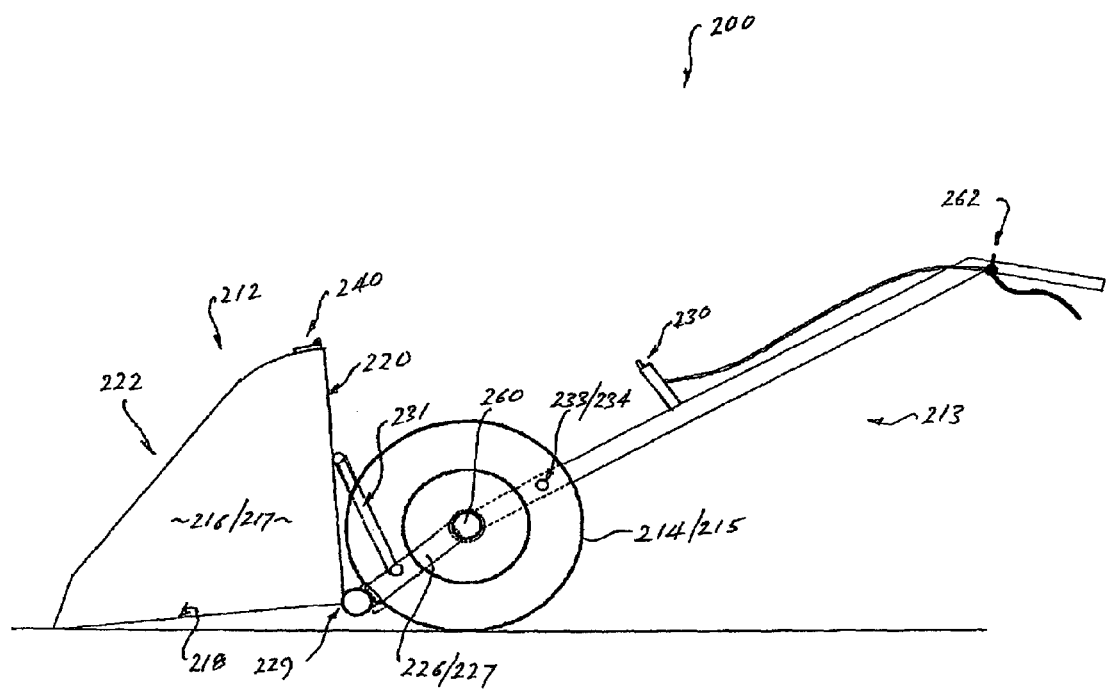
Figure 17:
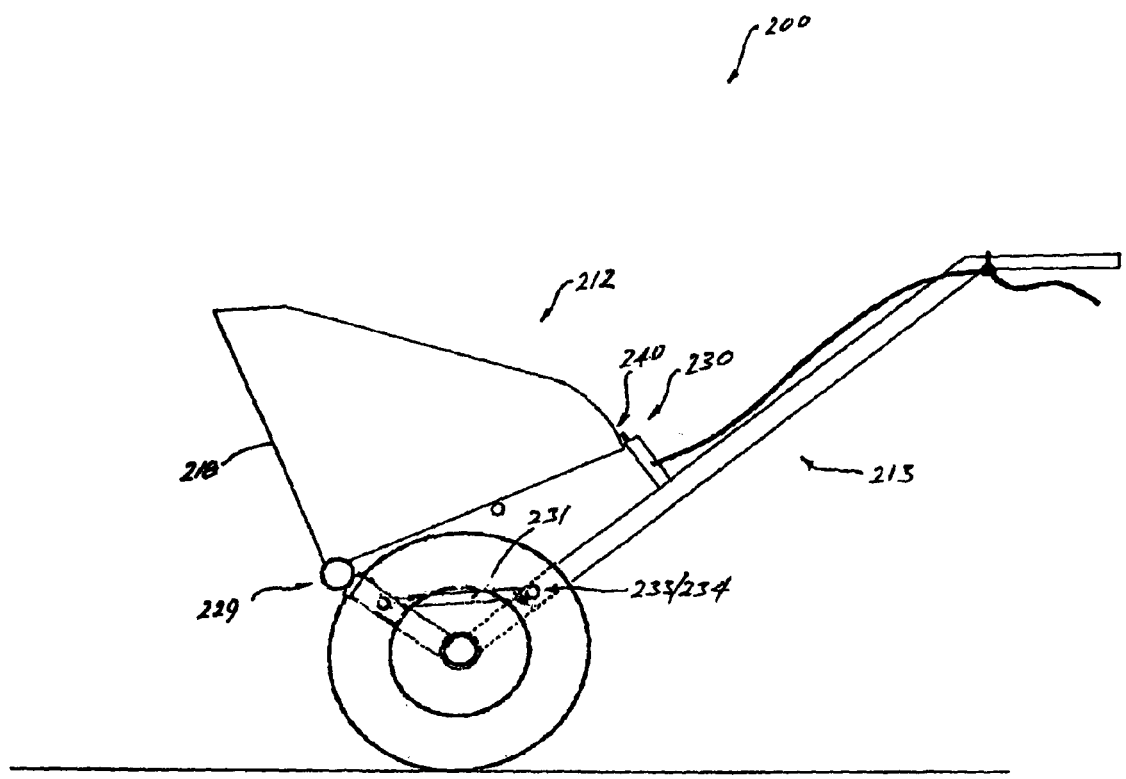
Figure 18:
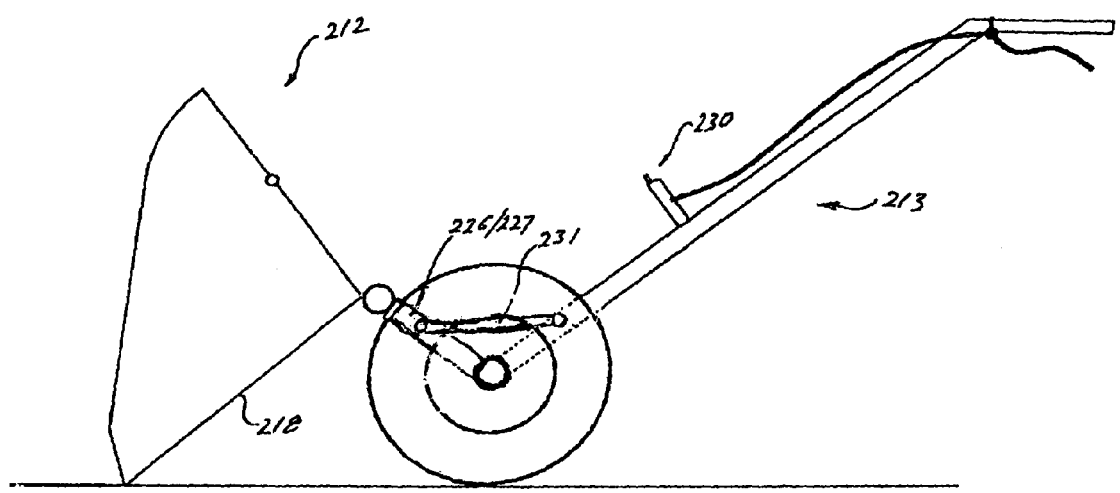
Figure 19:
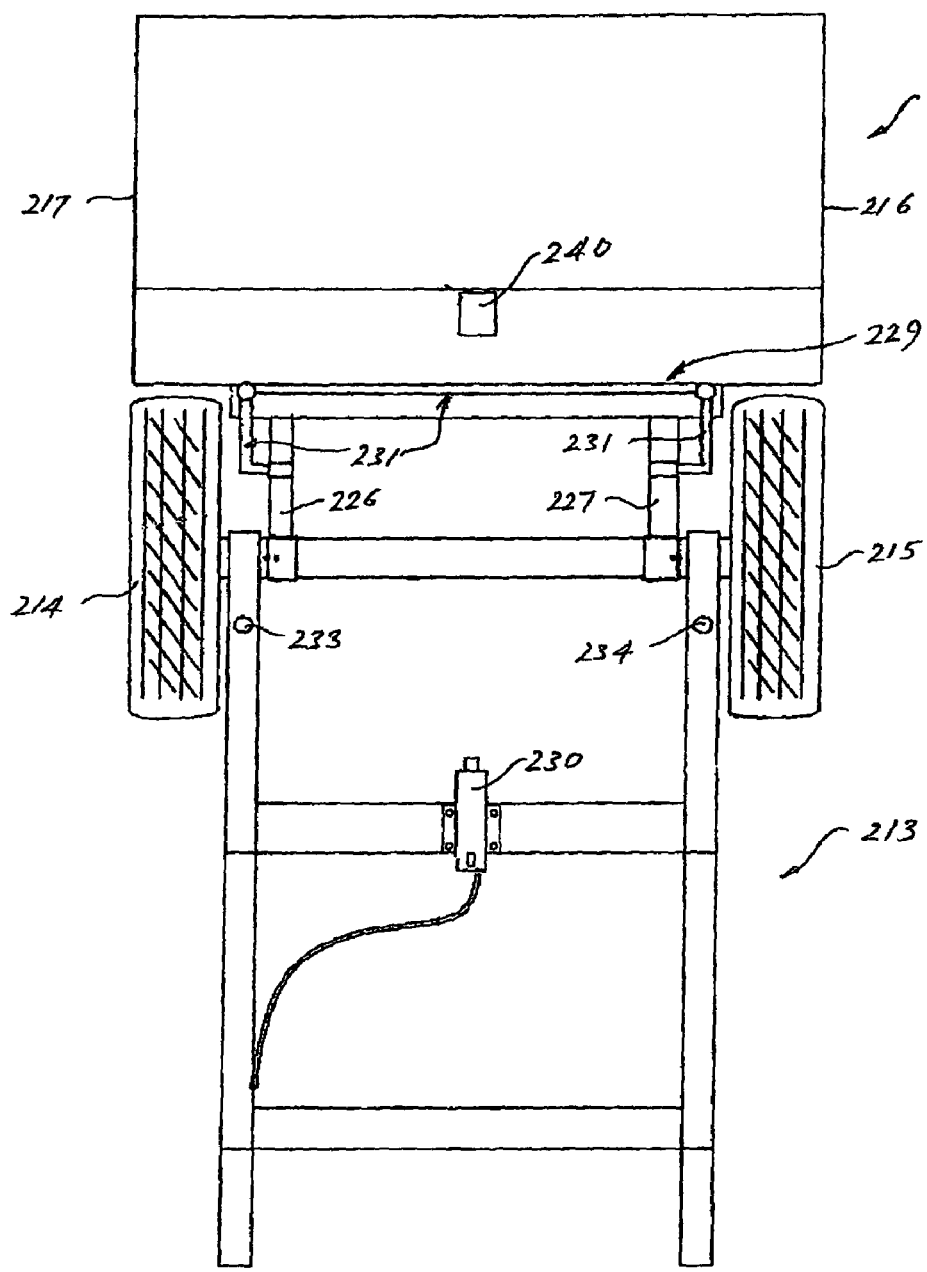

Embodiments of the present invention will now be described with reference to the accompanying drawings wherein:

FIG. 1 is a side elevation view of a first preferred embodiment of a wheeled load transfer device according to the invention, in a first latched condition, FIG. 2 is a side elevation view of the device of FIG. 1 in a second latched condition, FIG. 3 is a rear elevation view of the device of FIGS. 1 and 2, FIG. 4 is a front elevation view of the device of FIGS. 1 and 2, FIG. 5 is a plan view of the device of FIGS. 1 and 2, FIG. 6 is a side elevation view of the device of FIGS. 1 and 2 when in a preferred loading configuration, FIG. 7 is a side elevation view of the device of FIGS. 1 and 2 when in a load transfer configuration, FIG. 8 is a side elevation view of the device of FIGS. 1 and 2 when in a load discharge configuration, FIG. 9 is a side view of a wheeled load transfer device according to a second preferred embodiment of the invention, in a load scooping condition, FIG. 10 is a side view of the device of FIG. 9 in load transfer condition, FIG. 11 is a side view of the device of FIGS. 9 and 10 with a handle assembly rotated into a latching position, FIG. 11 is a side view of the device of FIGS. 9 and 10 in a load discharge condition, FIG. 12 is a side view of the device of FIG. 9 in a load transfer condition;

FIG. 13 is a front view of the device of FIG. 9 when in the load scooping condition, FIG. 14 is a rear view of the device of FIG. 9 when in the load scooping condition, FIG. 15 is a view from above of the device of FIG. 9 in the load scooping condition;

FIG. 16 is a side view of a further embodiment in the load scooping condition;

FIG. 17 is a side view of the device of FIG. 16 in a load transfer condition;

FIG. 18 is a side view of the device of FIG. 16 in a load discharge condition; and FIG. 19 is a top plan view of the device of FIG. 16 in a load scooping condition.

DETAILED DESCRIPTION OF PREFERRED EMBODIMENTS

First Preferred Embodiment

With reference to FIGS. 1 and 2, a wheeled load transfer device 10 comprises a load carrying member or bucket 12, a pair of coaxial wheels 14 and 15 (only one of which is visible in FIG. 1) disposed at opposite sides of bucket 12, and a handle assembly 13. Wheels 14 and 15 are preferably provided with pneumatic tyres.

As can be seen from FIGS. 1 and 7, the wheel mounting position on bucket 12 is such that the rear lower edge 23 of bucket 12 is clear of the supporting ground surface 50 when the bucket is in the loading attitude shown in FIG. 1 or in the transporting attitude shown in FIG. 7.

Bucket 12 comprises opposing, generally triangular-shaped sides 16 and 17, a bottom 18 and rear discharge door 20, as can be seen in FIGS. 3, 4 and 8. The front 22 of bucket 12 is open except for a short upper cover segment 24 (as best seen in FIGS. 4 and 5). Preferably, the leading front edge 48 is provided with a replaceable wear strip (not shown).

As best seen in FIGS. 3, 4 and 5, wheels 14 and 15 are mounted to axles projecting from wheel axle housings 26 and 27, which in turn are affixed to the opposite sides 16 and 17 respectively of bucket 12. Pivotally mounted to wheel axle housings 26 and 27, and preferably pivoting about the axes of wheels 14 and 15, are handle members 28 and 29 of handle assembly 13.

Referring again to FIGS. 1, 2, 4 and 5, handle assembly 13 is provided with a first cable operated spring-loaded latching mechanism 30 mounted to cross member 32 of handle assembly 13. Short upper cover segment 24 of bucket 12 is provided with at least first and second latch blocks 34 and 35 respectively adapted for engagement by the tongue 36 of first spring-loaded latching mechanism 30.

First spring-loaded mechanism 30 is adapted to lock handle assembly 13 in a first latched position relative to bucket 12 as shown in FIG. 1 when engaged with first latch block 34, or a second latched position as shown in FIG. 2 when engaged with second latch block 35. First spring-loaded latching mechanism 30, is controlled by a first lever assembly 38 and a first cable 39, attached to first handle member 28. As can be seen in FIGS. 5 and 6, first spring loaded latching mechanism 30 may be disengaged from either of the two latch blocks 34 or 35 so as to allow bucket 12 and handle assembly 13 to assume the relative positions shown in FIG. 6.

Rear discharge door 20 is hinged proximate its upper edge 21 about pivots 40 and 41 mounted in respective opposite sides 16 and 17 of bucket 12. A second cable operated spring-loaded latching mechanism 42 (best seen in FIG. 3) mounted at the lower edge 44 of rear discharge door 20, is adapted to allow the release of rear discharge door 20 from a normally closed position locked to the bottom 18 of the bucket 12, and is controlled similarly by a second lever assembly 46 and second cable 47 attached to second handle member 29.

In Use

It will be seen from FIG. 6 that when bucket 12 is unlatched from handle assembly 13, front lip 48 rests on the ground surface 50 and bottom 18 is only slightly inclined to surface 50, sufficient to leave rear lower edge 23 of bucket 12 clear of surface 50. By applying a forward force at handle assembly 13, bucket 12 acts as a scoop to at least partially fill the bucket from a heap of material 52. Alternatively, or additionally, material 52 may be readily scraped or raked into the bucket 12 without the need for any lifting or shovelling of the material to be transported.

Once a desired load has been gathered into bucket 12, the handle assembly 13 is rotated upwardly about the pivot axes of wheels 14 and 15 and the handle assembly 13 latched to the bucket 12 by engagement of the first spring-loaded latching mechanism 30 with the first latch block 34. In this position, relatively little downward force applied at the end of the handle assembly 13 will bring the bucket 12 into the attitude shown in FIG. 7. The handle assembly 13 is then approximately horizontal so that the outer ends of handle members 28 and 29 are adjacent the waist level of an average user, with the bottom 18 of bucket 12 inclined so as to securely retain the material in bucket 12. In this position the device allows the load of material to be easily wheeled to a point of destination.

When it is desired to discharge the load in bucket 12, the second spring-loaded mechanism 42 is activated to release rear discharge door 20 from its locked closed position, allowing it to swing rearward as shown in FIG. 8. Because of the slope of the bottom 18 of bucket 12, the material it contains will readily slide rearward and discharge through door 20.

To aid in discharging the material if required, the second latching position of the handle assembly 13 relative to bucket 12 afforded by second latch block 35, may be utilised as shown in FIG. 8 to increase further the slope of bottom 18. It will be obvious that the slope of the bottom 18 of bucket 12 may be made quite steep by inclining the handle assembly 13 further downward from that shown in FIG. 8. The device 10 can simply be wheeled forward as the discharge proceeds to allow all the material 52 to exit through rear discharge door 20.

When all material has been discharged, the device is tilted back to a position approximating that of FIG. 1 which allows the rear discharge door 20 to resume its locked closed position, for example by pushing the door closed with a foot of the user, and the device is ready for a next loading and transporting cycle.

The above describes only some embodiments of the present invention and modifications, obvious to those skilled in the art, can be made thereto without departing from the scope and spirit of the present invention.

For example whilst only a first spring loaded latching mechanism 30 is illustrated it may be required that more than one such mechanism is utilised in order to spread the latching load eg where the anticipated loading will be high. In this instance the single latching mechanism 30 shown in FIG. 5 could, for example, be replaced by a first and second latching mechanism mounted in spaced apart relationship mounted on cross member 32 and adapted for engaging with corresponding spaced apart latch blocks 34.

Second Preferred Embodiment

With reference now to FIGS. 9 to 15, a wheeled load transfer device 100 according to this second preferred embodiment, again comprises a load carrying member 112, a pair of coaxial wheels 114 and 115, and a handle assembly 113. Handle assembly 113 is attached to an axle member 160, so that the handle assembly may be rotated about the axis of coaxial wheels 114 and 115. Again as above, wheels 114 and 115 are preferably provided with pneumatic tyres.

In the present embodiment however, the pair of wheels 114/115 are located rearward of load carrying member 112 when in the load scooping position shown in FIG. 9. Load carrying member 112 is supported above the pair of wheels when in the load transporting position shown in FIG. 10. In this instance, load carrying member 112 is rotatably connected by frame members 126 and 127 to axle member 160, so that both load carrying member 112 and handle assembly 113 may be rotated about the axis of wheels 114 and 115 as shown in FIG. 11.

As best seen in the rear view of FIG. 14, wheels 114 and 115 are mounted to either side of handle assembly 113, but in contrast to the first embodiment above, are located substantially inboard of the side portions 116/117 of the load carrying member 112. Handle assembly 113 includes a cross member 132 to which is attached a load carrying member locking latch 130. Locking latch 130 allows load carrying member 112 to be latched for transporting a load in the transporting position shown in FIG. 10. Load carrying member locking latch 130 may be released by a sheathed cable 139 and cable activating handle 138 mounted at one of the hand grips 162 of the handle assembly 113, as best seen in FIGS. 11 and 14. The rearward portion of load carrying member 112 is provided with an upper cover segment 124 (as best seen in FIG. 13) to which is attached a latch striker plate 140.

When load carrying member 112 is in the scooping position of FIG. 9 the handle assembly 113 can be rotated upwards and forwards towards the load carrying member 112, until locking latch 130 automatically engages with striker plate 140 as shown in FIG. 11. Load carrying member 112 and handle assembly 113 can then be rotated together backwards and downwardly by a user to bring the load carrying member into the transporting position, with the loaded material substantially centred above the pair of wheels as shown in FIG. 10.

As for the first embodiment described above, load carrying member 112 comprises opposing, generally triangular-shaped sides 116 and 117, a bottom portion 118 and rear portion 120. The front 122 of load carrying member 112 is open except for the short upper cover segment 124 (as best seen in the front view of FIG. 13). Preferably, the leading front edge 148 is provided with a replaceable wear strip (not shown).

In this second embodiment, with reference to FIGS. 12 and 13, load carrying member 112 is provided with a load discharge door 119 substantially coextensive with the bottom portion 118. Discharge door 119 is hinged adjacent front load carrying member lip 121 as shown in FIG. 12. The trailing edge 144 (see FIG. 12) of discharge door 119, is maintained in a closed condition, (as shown in FIGS. 9 to 11 and 13 to 15) by a door latch mechanism 142 provided at the lower edge of rear portion 120. Door latch mechanism 142 may be foot operated, or alternatively may be controlled by a second sheathed cable 143 and operating lever (not shown) attached at the second hand grip of the handle assembly.

Third Preferred Embodiment

With reference to FIGS. 16 to 19, a wheeled transfer device 200 comprises a load carrying member 212, a pair of coaxial wheels 214 and 215, and a handle assembly 113. Handle assembly 213 is attached to an axle member 260 extending between coaxial wheels 214 and 215, so that the handle assembly 213 may be rotated about axle member 260. The pair of wheels 214 and 215 are located rearward of load carrying member 212 and substantially inboard of side members 216 and 217 of load carrying member 212, when the device 200 is in the load scooping position shown in FIG. 16.

The lower rear edge 229 of load carrying member 212 is hingedly attached to arms 226 and 227 (as best seen in FIG. 19) which are rotatably attached to axle member 260. A foot operated strut 231 is in turn hingedly attached to the arms 226 and 227, so that the strut may be rotated into a first position as shown in FIG. 16 in which its outer end is latched to rear portion 220 of load carrying member 212. The strut then acts as a brace between the arms 226 and 227 and the rear portion 220 of the load carrying member 212. With the strut 231 in this first position, the load transfer device may be urged forward to scoop a load of material from a supporting surface.

For transporting a load of material, the handle assembly 213 is rotated upwards and forwards towards the load carrying member 212 and the strut 231 released from its first position and allowed to engage latch points 233 and 234 on the handle assembly 213. Further rotation of the handle assembly 213 then allows the latch 230 to engage the striker plate 240 of the load carrying member 212 and the device may be brought into the position shown in FIG. 17 for transporting the load. Load carrying member 212 is then supported above the pair of wheels.

For unloading the transported material at a desired destination, the handle assembly 213 and still latched load carrying member 212 are rotated about the axis of coaxial wheels 214 and 215 until the leading edge of the load carrying member 212 is in contact with the supporting ground surface. The latch 230 is then activated to release load carrying member 212 from the handle assembly 213. It will be seen from FIG. 18 that with the strut 231 still linking the arms 226 and 227 to the handle assembly 213, rotation of the handle assembly back to the position shown in FIG. 18, forces the load carrying member 212 into a position in which the lower surface 218 of the load carrying member is steeply inclined, thereby readily discharging the material from the load carrying member 212.

After restoring the strut 231 back to its first position latched to the rear portion of the load carrying member and relatching the load carrying member to the handle assembly, the device 200 may be wheeled back for further transfers of loads of material.

In Use

The loading of the load transfer device 100 of the second preferred embodiment, is performed in a similar manner to the method of use for the first preferred embodiment above. With the load carrying member 112 released into the scooping position shown in FIG. 9, a user urges the front lip 121 along the ground surface and against a heap of the material to be moved (as was shown in FIG. 6 above), scooping as much as possible into load carrying member 112.

The user then rotates handle assembly 113 upwards and forwards until latch 130 engages with the striker plate 140 on the cover portion 124 of the load carrying member. Now with the load carrying member latched to the handle assembly 113, pulling the handle assembly back down into the position shown in FIG. 10, brings the loaded load carrying member to a substantially balanced position over wheels 114/115. The hand grips 162 are then approximately at the waist level of an average user, allowing the load to be easily wheeled from the loading location to a desired destination.

At the destination, the discharge door latch can be unlatched, allowing the discharge door to swing open under the combined effect of gravity and the load pressing against the door. The relatively steep angle of rear portion 120 then ensures that at least the major portion of the load slides out of the device.

In the second embodiment in which the discharge door is hinged from adjacent front edge 148, once emptied, a quick forward thrust of the device can be used to swing the discharge door back into its latched position, and the device is again ready for a further load transfer.

With the arrangement of the third embodiment, the leveraged tilting of the load carrying member allows the load to be deposited without the need to operate a discharge door.

The above describes only some embodiments of the present invention and modifications, obvious to those skilled in the art, can be made thereto without departing from the scope of the present invention.

What is claimed is:

1. A wheeled load transfer device comprising a load carrying member, a handle assembly and a pair of wheels; each wheel of said pair of wheels mounted to a separate axles each projecting from a different wheel axle housings on opposing sides of said load carrying member; said wheels having a common axis of rotation and supporting said load carrying member clear of a supporting ground surface while transferring a load of material between a loading location and a discharge location; said load carrying member comprising a bottom portion joining said opposing sides, a rear portion joining said sides and bottom portion and a load discharge door in said rear portion of said load carrying member; said handle assembly pivotally connected to said axle housings; said load carrying member and said handle assembly rotatable about said common axis; said load carrying member rotatable about said common axis relative to said handle assembly between a first loading position and second load transporting position, wherein a load of material is introduced into said transfer device at said loading position by a user applying forward force at said handle assembly during use; said load of material discharged through said discharge door at said discharge location during use; wherein said load carrying member is latched to said handle assembly into said load transporting position by a first spring-loaded latching mechanism; said load discharge door latched in a closed position by a second spring-loaded latching mechanism; at least one of said first and second latching mechanisms operated by a cable and lever assembly attached to said handle assembly.

2. The device of claim 1 wherein said device is adapted for scooping movement along a ground surface.

3. The device of claim 1 wherein said load carrying member is at least partially located between said pair of wheels.

4. The device of claim 1 wherein said discharge door is substantially coextensive with said rear portion; said rear discharge door pivotally hinged proximate an upper edge of said discharge door.

5. The device of claim 4 wherein a trailing edge of said discharge door is releasably latched in a closed position when said load carrying member is in said scooping position and in said transporting position.

6. The device of claim 1 wherein said handle assembly comprises first and second handle members and at least one cross member; said handle assembly pivotable about said common axis of said axle housings of said pair of wheels; said handle assembly pivotable between at least one fixed position latched to said load carrying member and unlatched positions.

7. The device of claim 6 wherein said first latching mechanism is adapted to releasably lock said handle assembly into said at least one fixed position relative said load carrying member; and wherein said first latching mechanism may be brought into engagement with said load carrying member by rotation upwardly of said handle assembly from said unlatched positions.

8. The device of claim 5 wherein said second latching mechanism is adapted to releasing said discharge door from a closed load retaining position to an open load discharge position; and wherein said material is discharged from said load carrying member by operating said second latching mechanism to release said discharge door from said closed load retaining position to said open load discharge position.

9. The device of claim 7 wherein each of said first latching mechanism and said second latching mechanism is operable by respective lever assemblies and respective first and second cables; said lever assemblies mounted to respective said handle members.

10. The device of claim 1 wherein, when said load carrying member is in said loading position, a front lip of said load carrying member is in contact with said ground surface supporting said device, and wherein said bottom portion is at a slight upward inclination to said surface; said inclination sufficient to provide clearance between a rear lower edge of said load carrying member and said supporting ground surface.

11. The device of claim 10 wherein said device may be urged into a scooping motion so as to load material from a volume of said material disposed on said ground surface, into said load carrying member; loading of said material effected without need of hand held implements.

12. The device of claim 1 wherein, after engagement of said handle assembly with said load carrying member, said device is brought into a position for transporting said material in said load carrying member by rotation downwardly of said handle assembly; outer ends of said handle assembly then at a height proximate the waist of an average user; said bottom portion of said load carrying member then inclined downwardly so as to secure said material within said load carrying member.

13. The device of claim 8 wherein said load carrying member is provided with an upper cover segment; said cover segment extending between said side portions and partially covering an open side of said load carrying member; said cover segment provided with a second latching element adapted to releasably engage with said first latching mechanism thereby to lock said handle assembly into a second fixed position relative said load carrying member; said second fixed position adapted to provide a greater angle of downward inclination of said bottom portion of said load carrying member during discharge of said material.

14. A method for loading and transporting material by means of a wheeled load transfer device; said method not requiring use of hand-held implements; said method including the steps of:
(a) a user unlatching a load carrying member of said device from a latched position relative to a handle assembly so as to rotate said load carrying member into a scooping position relative said handle assembly,
(b) said user grasping said handle assembly and urging said load carrying member against a volume of material disposed on a supporting ground surface so as to load at least a portion of said material into said load carrying member,
(c) said user rotating said handle assembly upwardly to a latched position relative said load carrying member,
(d) said user rotating said handle assembly downwardly to bring outer portions of said handle assembly proximate the waist of an average user, and
(e) said user wheeling said transfer device to an unload destination, and
(f) said user unlatching a discharge door from a first locked position to rotate said discharge door to a second open discharge position, said wheels being located on opposing sides of the discharge door and mounted to separate axles extending from separate axle housings so the wheel axle does not extend across a path travelled by the opening of the discharge door and no axle is in a path of the material discharged through the discharge door during use, said handle assembly being rotatably connected to said axles.

15. The method of claim 14 wherein said method includes the further steps of:
(a) rotating said load carrying member and said handle assembly such that said load carrying member is returned to said loading position,
(b) unlatching said handle assembly from said load carrying member,
(c) rotating said handle assembly downwardly to a load transporting position thereby to rotate said load carrying member into a discharge position wherein a bottom portion of said load carrying member is in a steeply inclined position.

16. A wheeled load transfer device comprising a load carrying member, a handle assembly and a pair of wheels mounted to axle housings at either side of said load carrying member; said wheels having a common axis and supporting said load carrying member clear of a supporting ground surface while transferring a load of material between a loading location and a discharge location; said load carrying member comprising opposing a bottom portion joining said sides, a rear portion and a discharge door substantially coextensive with said bottom portion of said load carrying member; said discharge door hingedly connected to a front lip of said load carrying member; said load carrying member and said handle assembly connected to, and rotatable about, said axle housings; said load carrying member rotatable about said common axis relative said handle assembly between a first loading position and second load transporting position, wherein a load of material is introduced into said transfer device at said loading position by a user applying forward force at said handle assembly; said load of material discharged through said discharge door at said discharge location; wherein said load carrying member is latched to said handle assembly into said load transporting position by a first cable operated, spring-loaded latching mechanism; said load discharge door latched into a closed position by a second cable operated, spring-loaded latching mechanism; each of said first and second latching mechanisms operated respectively by a first and second lever assembly attached to said handle assembly, wherein said discharge door is substantially coextensive with said bottom portion of said load carrying member; said discharge door hingedly connected to a front lip of said load carrying member.

17. The wheeled load transfer device of claim 1, wherein the wheels are mounted a distance apart that is greater than the corresponding dimension of the load discharge door.

* * * * *